United States Patent [19]

Shimizu et al.

[11] Patent Number: 5,416,692
[45] Date of Patent: May 16, 1995

[54] AC POWER SUPPLYING UNIT WITH SELF MONITORING OF AC OUT AND DETECTION OF LEAKAGE

[75] Inventors: Motohiro Shimizu; Masashi Nakamura, both of Wako, Japan

[73] Assignee: Honda Giken Kogyo Kabushiki Kaisha, Tokyo, Japan

[21] Appl. No.: 214,010

[22] Filed: Mar. 15, 1994

Related U.S. Application Data

[63] Continuation of Ser. No. 896,623, Jun. 10, 1992, abandoned.

[30] Foreign Application Priority Data

Jun. 17, 1991 [JP] Japan .................... 3-171762

[51] Int. Cl.⁶ ............................. H02M 7/525
[52] U.S. Cl. ......................... 363/98; 363/132; 361/45
[58] Field of Search ............ 363/95, 98, 132, 55–58; 361/42, 45, 49

[56] References Cited

U.S. PATENT DOCUMENTS

| | | | |
|---|---|---|---|
| 2,083,920 | 6/1937 | Powell | 361/42 |
| 3,066,284 | 11/1962 | McKinley | 361/42 |
| 3,609,281 | 9/1971 | Kauffman | 219/69.13 |
| 3,699,392 | 10/1972 | Lee et al. | 361/49 |
| 4,172,982 | 10/1979 | Kompelien | 307/117 |
| 4,238,784 | 12/1980 | Keen et al. | 340/347 |
| 4,403,267 | 9/1983 | Verhoff et al. | 361/42 |
| 4,872,100 | 10/1989 | Diaz | 363/41 |
| 5,019,935 | 5/1991 | Nakamura | 361/45 |
| 5,166,870 | 11/1992 | Shimizu et al. | 363/41 |
| 5,309,345 | 5/1994 | Nakamura et al. | 363/41 |

FOREIGN PATENT DOCUMENTS

| | | |
|---|---|---|
| 59-132398 | 9/1984 | Japan . |
| 63-114527 | 5/1988 | Japan . |
| 3-93499 | 4/1991 | Japan . |
| 4183275 | 6/1992 | Japan . |
| 4-207920 | 7/1992 | Japan . |

Primary Examiner—Thomas M. Dougherty
Assistant Examiner—Adolf Berhane
Attorney, Agent, or Firm—Frishauf, Holtz, Goodman & Woodward

[57] ABSTRACT

An invertor-controlled power unit includes an invertor circuit which performs switching control of direct current output from a direct current power source circuit in response to a driving signal. A bridge balanced circuit is connected to a pair of output lines extending from an output circuit of the power unit. The bridge balanced circuit has at least two balanced points and comprises a plurality of impedance elements connected to the pair of output lines. One of the balanced points is grounded. A potential difference between the one of the balanced points and another of same is detected, and a detection signal indicative of the potential difference is produced. When the detection signal falls outside a predetermined range, i.e. it is determined that a leak occurs, a stoppage instruction signal is produced to stop the supply of the driving signal to the invertor circuit.

7 Claims, 6 Drawing Sheets

AC POWER SUPPLYING UNIT WITH SELF MONITORING OF AC OUT AND DETECTION OF LEAKAGE

This application is a Continuation of application Ser. No. 07/896,623, filed Jun. 10, 1992, now abandoned.

BACKGROUND OF THE INVENTION

1. Field of the Invention

This invention relates to an invertor-controlled power unit incorporating an invertor device, which is driven by an engine to supply AC power.

2. Prior Art

In recent years, portable AC power units have been increasing in number, which are equipped with invertor devices for stabilizing the output frequency. For example, a portable power unit which generates AC power having a commercial frequency by means of an AC generator driven by an engine is known, e.g. by Japanese Provisional Utility Model Publication (Kokai) No. 59-132398, in which the engine is operated within a high speed range to cause the AC generator to generate high AC output, the output is converted into direct current, then the direct current is converted into alternating current by an invertor device, and the alternating current is outputted.

It has been also proposed, e.g. by Japanese Provisional Patent Publication (Kokai) No. 63-114527, to additionally provide such a portable invertor-controlled AC power unit with an excessive current protection device which is adapted for use in a portable power unit having a relatively small capacity.

However, if it is required to provide an AC power unit of this type with means for cutting off a leak, means for detecting a leak has to be provided in addition to the excessive current protection device, since the amount of leak current to be detected is often relatively small in such a small capacity power unit. Therefore, in most cases, an external earth leakage breaker is used to cope with a leak in the portable AC power unit of this type.

However, a portable AC power unit having an external earth leakage breaker suffers from problems of an increased size, overlapping functions, and a high cost.

To solve these problems, the present assignee has proposed an invertor-controlled power unit in Japanese Patent Application No. 2-333714, which employs a current transformer for leak detection. The proposed power unit is very excellent in that it has a leak detecting construction which is small in size, light in weight and low in manufacturing cost, and it is able to cut off a leak in quick response to the leak. However, since the power unit uses the current transformer, it is difficult to incorporate leak detection/cutting-off means onto a circuit board, as well as further decrease the size and cost.

SUMMARY OF THE INVENTION

It is the object of the invention to provide an invertor-controlled power unit incorporating leak detection/cutting-off means, which is simple in construction, small in size, light in weight, and low in manufacturing cost, and can be easily implemented onto a circuit board, while dispensing with the use of a current transformer for leak detection, by utilizing the construction of means for driving an invertor circuit of the invertor-controlled power unit.

To attain the object, the present invention provides an-invertor-controlled power unit including an alternating current generator, a direct current power source circuit for rectifying an alternating current output from the alternating current generator and outputting a direct current output, driving signal-forming means for forming and outputting a driving signal, an invertor circuit connected to the driving signal-forming means for performing switching control of the direct current output in response to the driving signal, an output circuit connected to the invertor circuit for outputting an alternating current output having a predetermined frequency, and a pair of output lines connected to the output circuit.

The invertor-controlled power unit according to the invention is characterized by comprising:

a bridge balanced circuit connected to the pair of output lines, the bridge balanced circuit having at least two balanced points and comprising a plurality of impedance elements connected to the pair of output lines;

a grounding terminal grounding one of the balanced points;

detecting means for detecting a potential difference between the grounding terminal and another of the balanced points and outputting a detection signal indicative of the detected potential difference; and determining means for determining whether the detection signal falls within a predetermined range, and supplying a stoppage instruction signal to the driving signal-forming means when the detection signal falls outside the predetermined range;

wherein the drive signal-forming means stops outputting the drive signal in response to the stoppage instruction signal from the determining circuit.

Preferably, the determining means comprises a first comparator having an upper limit reference value corresponding to an upper limit of the predetermined range, and a second comparator having a lower limit reference value corresponding to a lower limit of the predetermined range, the detection signal from the detecting means being compared with the upper limit reference value and the lower limit reference value by the first and second comparators, respectively, the determining means outputting the stoppage instruction signal when the detection signal falls outside the predetermined range defined by the upper limit reference value and the lower limit reference value.

More preferably, the bridge balanced circuit is formed of two pairs of two serially connected resistances connected between the pair of output lines, the one of the two balanced points being a junction of one of the two pairs of two serially connected resistances, and the another of the two balanced points being a junction of the other of the two pairs of two serially connected resistances.

Further preferably, the invertor-controlled power unit includes a transient inhibit circuit for stopping the operation of the direct current power source circuit when the power unit is in a predetermined transient condition, wherein the stoppage instruction signal is supplied to the transient inhibit circuit, and the transient inhibit circuit stops the operation of the direct current power source circuit in response to the stoppage instruction signal.

More preferably, the stoppage instruction signal is supplied to the driving signal-forming means by way of the transient inhibit circuit.

DETAILED DESCRIPTION

The invention will now be described in detail with reference to the drawings showing embodiments thereof.

Referring first to FIGS. 1 to 5, there is shown the whole arrangement of an invertor-controlled power unit according to an embodiment of the invention.

Figure 1:
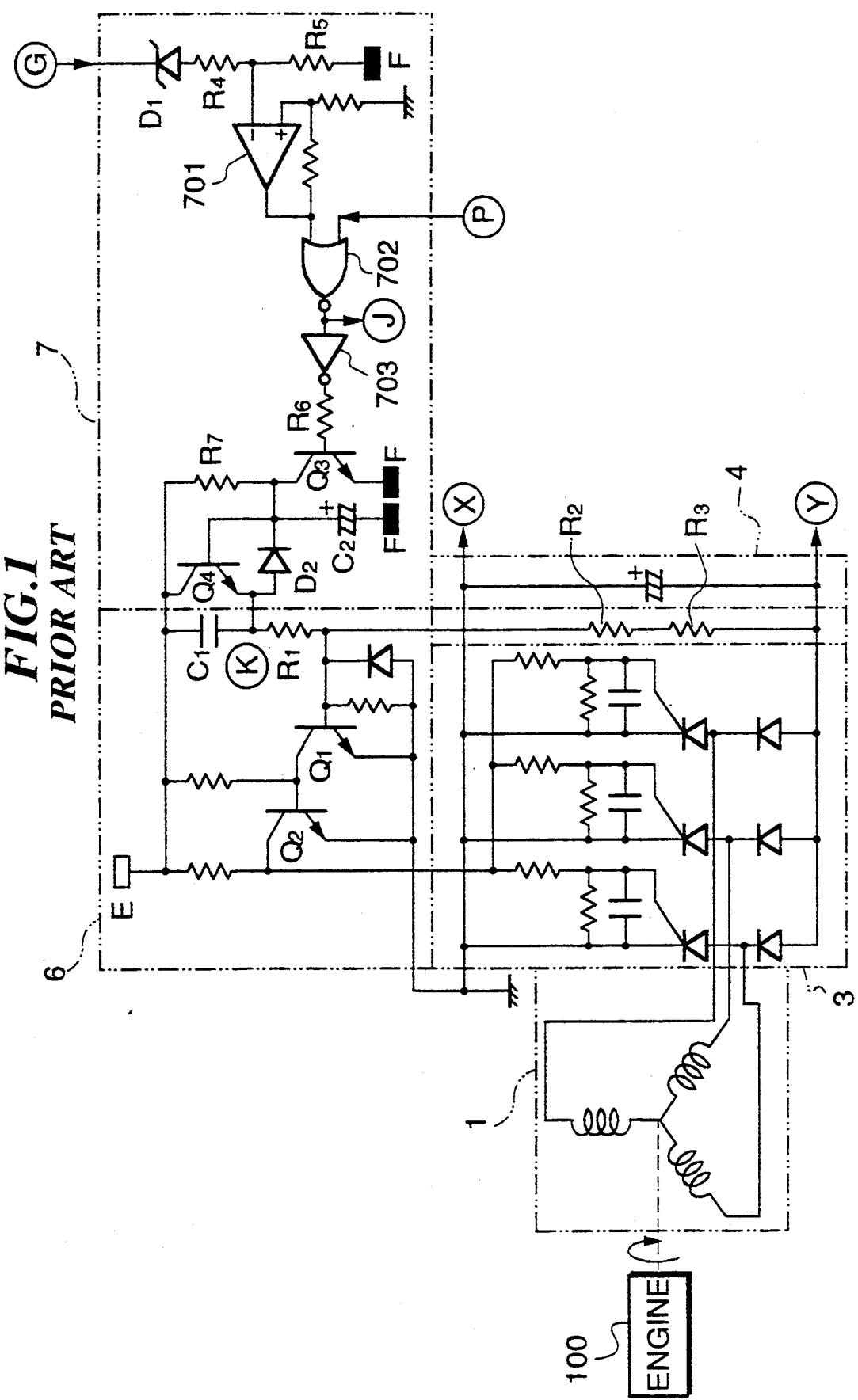
FIG. 1 is a circuit diagram showing component parts including a bridge rectifier and a transient inhibit circuit, which constitute part of an invertor-controlled power unit according to an embodiment of the invention.
Figure 2:
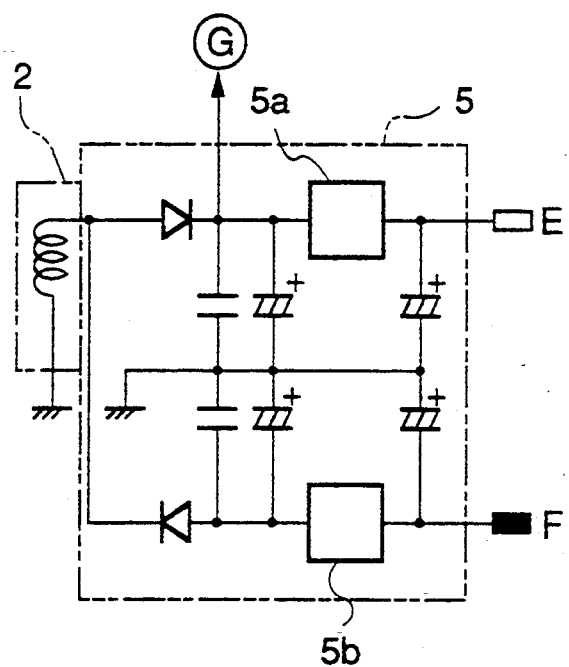
FIG. 2 is a circuit diagram showing component parts including a constant-voltage regulator circuit, which constitute part of the invertor-controlled power unit according to the embodiment.

In FIGS. 1 and 2, reference numerals 1 and 2 designate respectively a three-phase output winding and a single-phase auxiliary winding (control winding) wound on a common stator core, not shown, of an AC generator, separately from each other.

A magnet rotor, not shown, having a plurality of magnetic poles is arranged to be rotatively driven by an engine 100. The three-phase output winding 1 has its output connected to a bridge rectifier 3 comprised of three thyristors and three diodes, which in turn has its output connected to a smoothing circuit 4.

The single-phase auxiliary winding 2 has its output connected to a constant-voltage regulator circuit 5 having positive and negative output terminals E and F. The constant-voltage regulator circuit 5 has two sets of rectifiers, smoothing circuits, and constant-voltage regulators 5a, 5b, one set being operable in response to current flowing in one direction from the auxiliary winding 2, the other set in response to current flowing in the other direction from the winding 2 so that the output terminals E, F supply positive constant voltage and negative constant voltage, respectively.

Reference numeral 6 designates a thyristor control circuit which has a power source-input terminal connected to the positive output terminal E of the constant-voltage regulator circuit 5, and another terminal grounded together with a positive terminal of the smoothing circuit 4. The thyristor control circuit 6 has a signal-input terminal formed of a series circuit of a capacitor C1, and resistances R1 to R3. One end of the series circuit on the capacitor C1 side is connected to the positive output terminal E of the constant-voltage regulator circuit 5, while the other end of the series circuit on the resistance R3 side is connected to a negative terminal of the smoothing circuit 4. The junction between the resistances R1 and R2 is connected to a base of a transistor Q1, which has a collector connected to a base of a transistor Q2. The transistor Q2 in turn has a collector connected to gate input circuits of the thyristors of the bridge rectifier 3. The thyristor control circuit 6, which is arranged as above, controls input signals to the gate input circuits according to a potential at the junction between the resistances R1 and R2 (details of the thyristor control circuit 6 are disclosed in Japanese Provisional Patent Publication (Kokai) No. 3-93499 filed by the assignee, and therefore detailed description thereof is omitted here).

A junction K between the capacitor C1 and the resistance R1 is connected to the output of a transient inhibit circuit 7. The transient inhibit circuit 7 has a Zener diode D1, which has a cathode connected to an input terminal G of the constant-voltage regulator 5a provided on the positive output terminal E side of the constant-voltage regulator circuit 5, and an anode connected to the negative output terminal F of the constant-voltage regulator circuit 5 via resistances R4 and R5. The junction of the resistances R4 and R5 is connected to an inverting input terminal of an inverting comparator 701 formed of an operational amplifier. The inverting comparator 701 has a non-inverting input terminal grounded via a resistance. The output of the inverting comparator 701 is connected to one input terminal of a NOR circuit 702, which has the other input terminal connected to a leak-detecting circuit 8, described in detail hereinafter. The leak-detecting circuit 8 supplies a high level signal to the NOR circuit 7 when it detects a leak. The output (J) of the NOR circuit 702 is connected to inputs of NAND circuits 20, 21, described hereinafter, and at the same time via an invertor 703 and a resistance R6 to a base of a transistor Q3. The transistor Q3 has an emitter connected to the negative output terminal F of the constant-voltage regulator circuit 5, and a collector connected to the positive output terminal E of the constant-voltage regulator circuit 5 via a resistance R7 and to the negative output terminal F of the constant-voltage regulator circuit 5 via a capacitor C2. The capacitor C2 has a positive terminal connected to a base of a transistor Q4, which in turn has a collector connected to the positive output terminal E of the constant-voltage regulator circuit 5 and an emitter connected to an anode of a diode D2 and the junction K between the capacitor C1 and the resistance R1 of the thyristor control circuit 6. The diode D2 has a cathode connected to the positive terminal of the capacitor C2.

Figure 3:
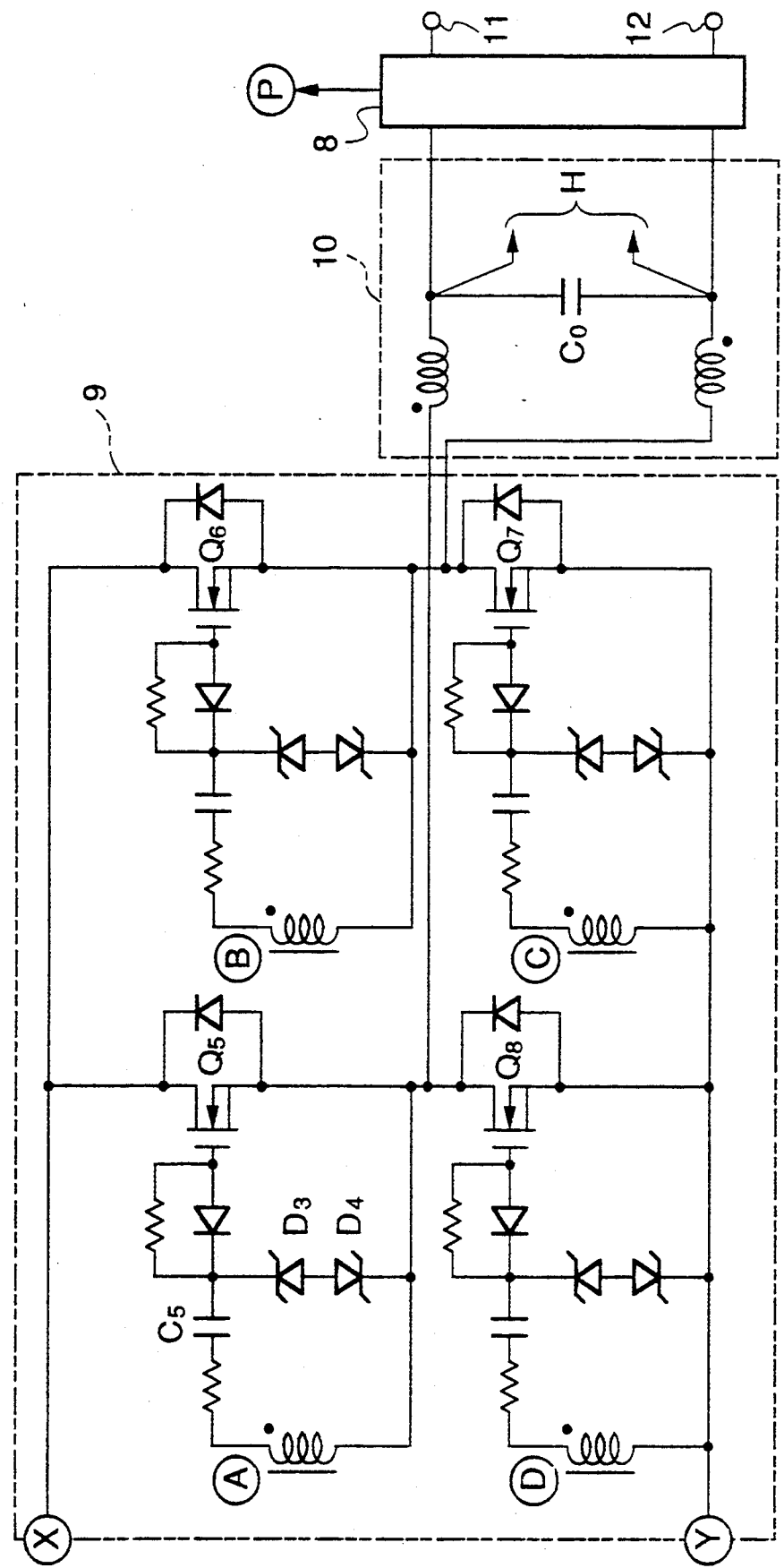
FIG. 3 is a circuit diagram showing component parts including an invertor circuit, which constitute part of the invertor-controlled power unit according to the embodiment.

As shown in FIG. 3, the smoothing circuit 4 has its output connected to an invertor circuit 9. The invertor circuit 9 is formed by a bridge circuit composed of four FET's (field effect transistors) Q5—Q8 as switching elements which have their gates connected to FET gate-driving signal circuits 22, 23 hereinafter referred to.

The output of the invertor circuit 9 is connected to output terminals 11 and 12 via an output circuit 10 formed by a low-pass filter having a capacitor C0, and the leak-detecting circuit 8. A load, not shown, is connected to the output terminals 11, 12.

Figure 4:
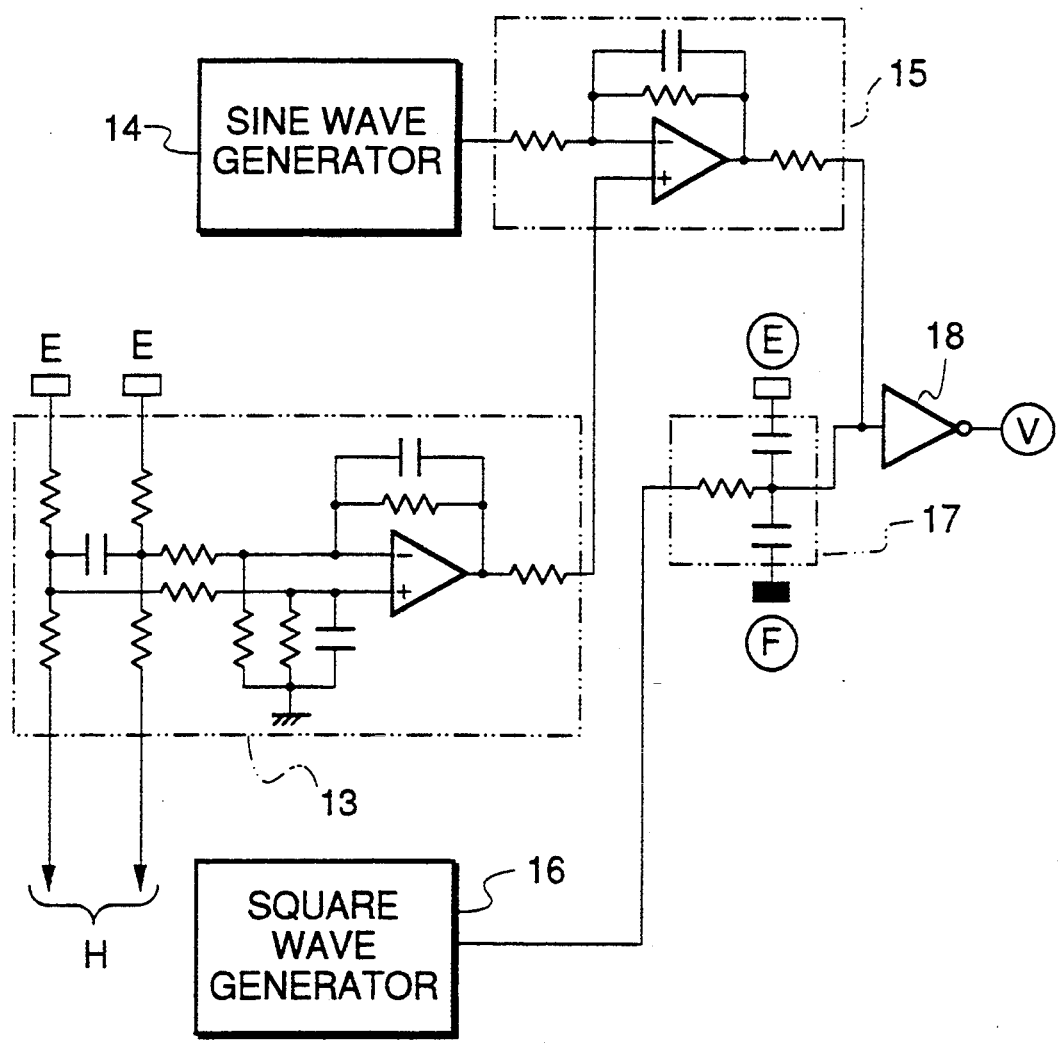
FIG. 4 is a circuit diagram showing component parts including a distortion-detecting circuit, which constitute part of the invertor-controlled power unit according to the embodiment.

The capacitor C0 of the low-pass filter has its opposite ends H connected to a distortion-detecting circuit 13 formed of dividing resistances, a differential amplifier, etc, shown in FIG. 4. The distortion-detecting circuit 13 directly compares between voltages appearing on the output terminals 11 and 12 to thereby detect distortions in the waveform of the power unit output voltage and an offset component thereof and outputs a signal indicative of the results of the comparison.

Reference numeral 14 designates a sine wave generator which generates a sine wave reference signal having a commercial frequency, e.g. 50 Hz or 60 Hz. The output of the sine wave generator 14 is connected to an inverting input terminal of a differential amplifier 15, while the output of the distortion-detecting circuit 13 is connected to a non-inverting input terminal of the differential amplifier 15. The differential amplifier 15 corrects the level of the sine wave reference signal supplied from the sine wave generator 14 by the signal supplied from the distortion-detecting circuit 13, and outputs a corrected sine wave reference signal.

Reference numeral 16 designates a square wave generator which generates a square wave signal having a frequency by far higher than the frequency of the sine wave reference signal generated by the sine wave generator 14. The output of the square wave generator 16 is connected to an integrating circuit 17, which integrates the square wave signal into a triangular wave signal.

The corrected sine wave signal from the differential amplifier 15 and the triangular wave signal from the integrating circuit 17 are superposed upon each other and the superposed signal is then supplied to an invertor buffer 18. The invertor buffer 18 is formed by an amplifier with a predetermined fixed threshold level which operates such that when a signal having a level exceeding the threshold level is inputted, it outputs an amplified low level signal, while when a signal having a level below the threshold value is inputted, it outputs an amplified high level signal, thus forming a pulse width modulated (PWM) signal. The invertor buffer 18 may be formed by an IC having a fixed threshold level relative to its gate input level, e.g. a threshold level of a CMOS gate on the input terminal side.

Figure 5:
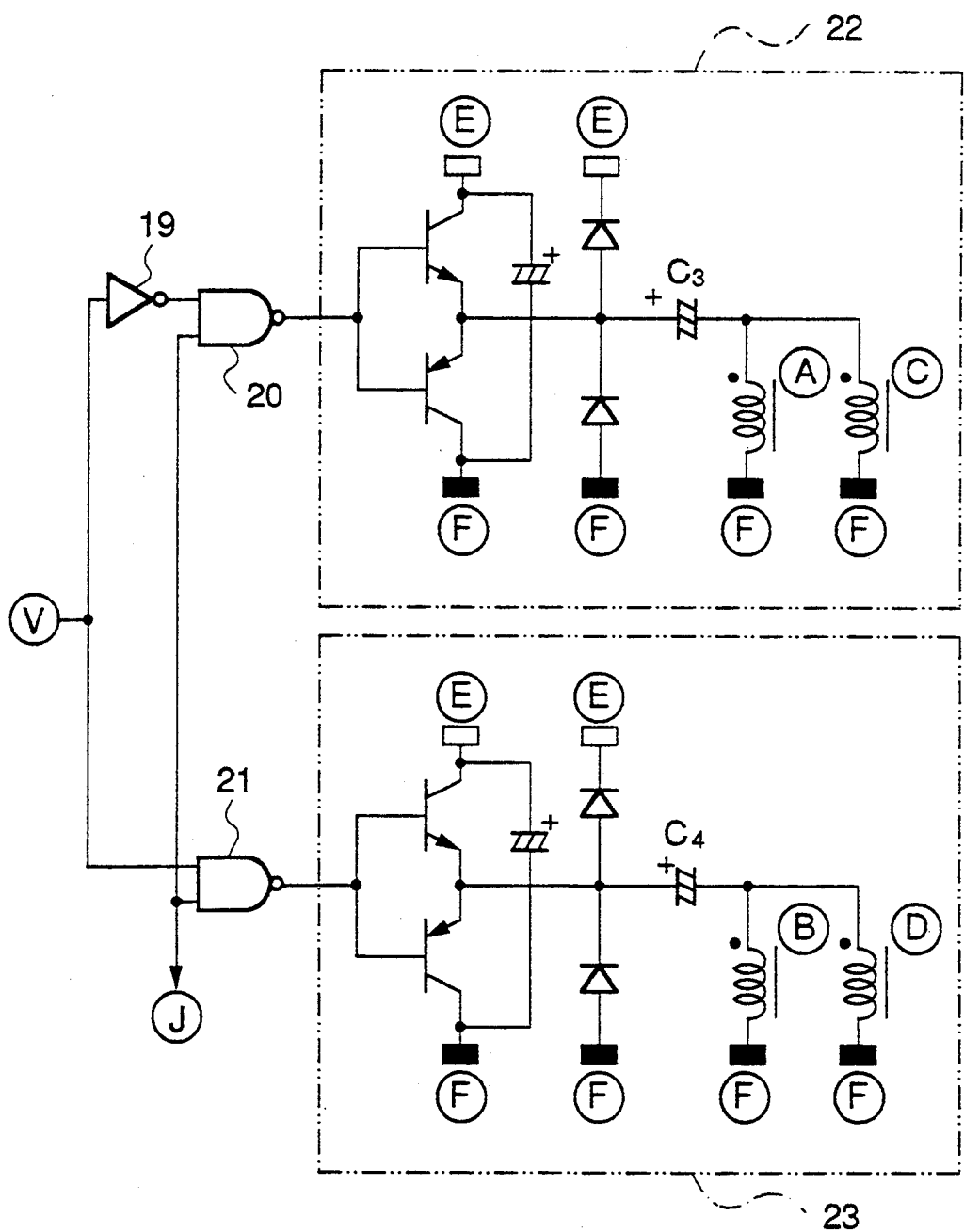
FIG. 5 is a circuit diagram showing component parts including FET gate-driving signal circuits, which constitute part of the invertor-controlled power unit according to the embodiment.

As shown in FIG. 5, the output of the invertor buffer 18 is connected via an invertor 19 to an input terminal of the aforementioned NAND circuit 20, and directly connected to an input terminal of the aforementioned NAND circuit 21. The other input terminals of the NAND circuits 20, 21 are connected to the output J of the NOR circuit 702 of the transient inhibit circuit 7, as described hereinbefore.

The outputs of the NAND circuits 20, 21 are connected to the FET gate-driving signal circuits 22, 23, respectively. The FET gate-driving signal circuit 22 is comprised of a push-pull amplifier, diodes for absorbing surge, a capacitor C3 for eliminating low frequency components, and primary coils of pulse transformers A, C. Similarly, the gate-driving signal circuit 23 is comprised of a push-pull amplifier, diodes for absorbing surge, a capacitor C4 for eliminating low frequency components, and primary coils of pulse transformers B, D.

The secondary coil of the pulse transformer A (appearing in the invertor circuit 9 in FIG. 3) is connected to a gate of the FET Q5 via a damping resistance, a capacitor C5 for reproducing the pulse width modulated signal, and a two-way voltage limitter formed of diodes D3, D4. The secondary coils of the pulse transformers B, C, D are connected to gates of the FET's Q6, Q7, Q8, respectively, via circuits each of which is identical to that described with respect to the secondary coil of the pulse transformer A.

Figure 6:
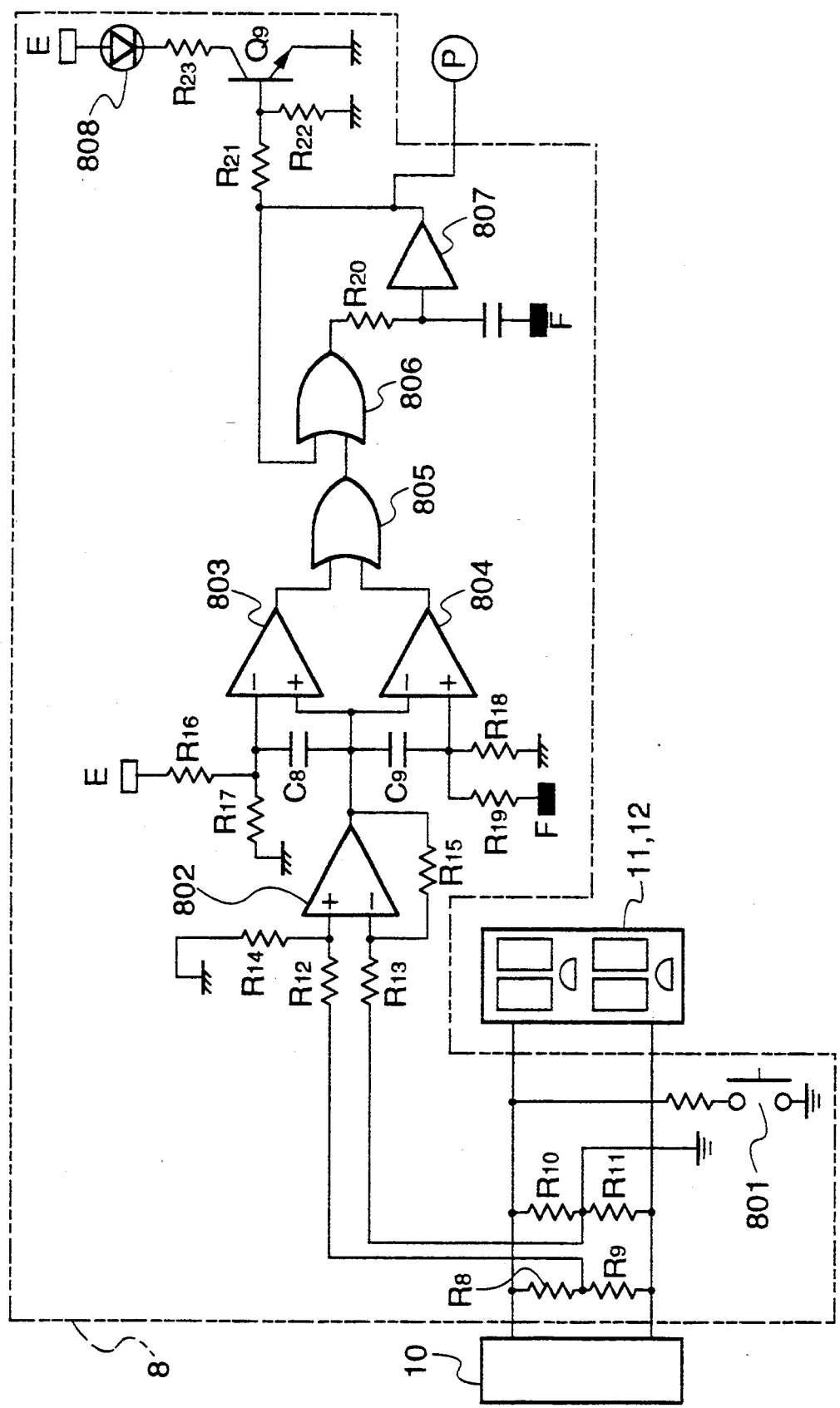
FIG. 6 is a circuit diagram showing details of a leak-detecting circuit appearing in FIG. 3.

Next, the leak-detecting circuit 8 (formed of a grounding circuit and an abnormality-determining circuit) will be described in detail with reference to FIG. 6.

A pair of output lines extending from the output circuit 10 to the output terminals 11, 12 are connected to a bridge balanced circuit formed of resistances R8, R9, R10, and R11 connected by cascade connection between the output lines. The junction between the resistances R10 and R11, which serves as one balanced point of the bridge balanced circuit, forms a grounding terminal which is grounded, while the junction between the resistances R8 and R9, which serves as another balanced point of the bridge balanced circuit, is connected via a resistance R12 to a non-inverting input terminal of an operational amplifier 802, which has an inverting input terminal thereof connected via a resistance R13 to the grounding terminal. The non-inverting input terminal of the amplifier 802 is grounded via a resistance R14, and the inverting input terminal thereof is connected via a resistance R15 to an output terminal thereof. The operational amplifier 802 detects and amplifies a difference in potential between the balanced points of the bridge balance circuit.

Further, one of the output lines is connected to a test switch 801 which opens and closes a grounded line.

Reference numerals 803, 804 designate operational amplifiers which serve as comparators. The output of the operational amplifier 802 is connected to a non-inverting input terminal of the operational amplifier 803 and an inverting input terminal of the operational amplifier 804. An inverting input terminal of the operational amplifier 803 is supplied with voltage having a predetermined positive value (upper limit reference value) which is obtained by dividing a potential difference between the positive output terminal E of the constant-voltage regulator circuit 5 and the ground by resistances R16 and R17. On the other hand, a non-inverting input terminal of the operational amplifier 804 is supplied with voltage having a predetermined negative value (lower limit reference value) which is obtained by dividing a potential difference between the ground and the negative output terminal F of the constant-voltage regulator circuit 5 by resistances R18 and R19. Further, a capacitor C8 is connected between the input terminals of the operational amplifier 803, while a capacitor C9 between those of the operational amplifier 804. The outputs of the operational amplifiers 803 and 804 are connected to the input of an OR circuit 805.

The output of the OR circuit 805 is connected to one input terminal of an OR circuit 806. The output of the OR circuit 806 is connected via a series circuit formed of a resistance R20 and a capacitor C10 to the negative input terminal F of the constant-voltage regulator circuit 5. The junction of the resistance R20 with the capacitor 10 is connected via a buffer 807 to the input terminal P of the NOR circuit 702 of the transient inhibit circuit 7.

The output of the buffer 807 is connected to the other input terminal of the OR circuit 806 and also connected via a resistance R21 to a base of a transistor Q9, which is grounded via a resistance R22. The transistor Q9 has an emitter directly grounded, and a collector connected via a series circuit formed of a resistance R22 and a light-emitting diode 808 to the positive output terminal E of the constant-voltage regulator circuit 5.

Next, the operation of the invertor-controlled power unit constructed as above will be described.

As the engine generator is driven by the engine, the three-phase output winding 1 generates three-phase AC power which is rectified by the bridge rectifier 3, and then smoothed into DC power by the smoothing circuit 4, while variation in the DC voltage in the smoothing circuit 4 is detected via the resistances R2, R3 by the thyristor control circuit 6, which supplies a signal indicative of the results of the detection to the thyristors of the bridge rectifier 3 to thereby effect on/off control of the thyristors, such that the output voltage from the smoothing circuit 4 is stably kept at a predetermined DC voltage in a feedback manner. In this connection, the thyristor control circuit 6 is also supplied with an output signal from the transient inhibit circuit 7. The operation of the thyristor control circuit 6 and the bridge rectifier 3 responsive to the output signal will be described later.

The FET's Q5, Q7 and FET's Q6, Q8 of the invertor 9 have their gates supplied with the pulse width-modulated (PWM) signal so that the FET's Q5, Q7 are caused to conduct alternately, and so do the FET's Q6, Q8 to effect switching control of the DC output from the smoothing circuit 4. The switch-controlled output is supplied to the output circuit 10 where high frequency components thereof are removed. The output from the output circuit 10 is supplied via the leak-detecting circuit 8 through the output terminals 11, 12 to the load as commercial-frequency AC power.

The output voltage appearing at the output terminal 11 and the output voltage appearing at the output terminal 12 are supplied to the distortion-detecting circuit 13, where they are compared with each other to detect a distortion in the waveform of the power unit output voltage or an offset component of same, and a signal indicative of the detected distortion or offset component is supplied to the differential amplifier 15.

The differential amplifier 15 compares the sine wave signal having a commercial frequency from the sine wave generator 14 with the feedback signal from the detecting circuit 13 containing distortions in the waveform of the output voltage and DC offset components of same, and corrects the level of the former by the latter, to output a corrected sine wave signal.

The square wave signal from the square wave generator 16 is integrated by the integrating circuit 17 into a triangular wave signal. This triangular wave signal is superposed upon the corrected sine wave signal from the differential amplifier 15 into a superposed signal, which is supplied to the invertor buffer 18. The invertor buffer 18 generates a low level output when supplied with an input having a level exceeding its threshold level, and generates a high level output when supplied with an input having a level below the threshold level. The resulting pulse train signal outputted from the invertor buffer 20 is a pulse width-modulated (PWM) signal obtained by pulse width modulating the corrected sine wave signal by the triangular signal as the carrier wave. Since the PWM signal is created by the use of the corrected sine wave signal, the AC output voltage can be corrected such that distortions in the waveform thereof and offset components are reduced. Further, the use of the invertor buffer having a response time (approx. 50 nsec.) by far shorter than that (approx. 1 sec.) of a comparator used in conventional PWM type invertor devices affords increasing the frequency of a carrier wave used for forming the PWM signal, which enables to supply AC power having high quality which has an output waveform closer to the waveform of a sine wave.

The PWM signal from the invertor buffer 18 is, on one hand, inverted by the invertor 19 and then supplied to the NAND circuit 20, while on the other hand it is directly supplied to the NAND circuit 21. The NAND circuits 20, 21 are supplied with a low level signal from the transient inhibit circuit 7 when a leak is detected by the leak-detecting circuit 8 or when the rotational speed of the engine is low (e.g. at the start of the engine where the rotational speed of the engine has not risen to a sufficient level). Accordingly, the NAND circuits 20, 21 continue to output high level signals irrespective of the pulse level of the PWM signal, thus the PWM signal being prevented from being transmitted to the invertor circuit 9. When no leak is detected, and at the same time the engine rotational speed is sufficiently high, the NAND circuits 20, 21 are supplied with a high level signal from the transient inhibit circuit 7. Accordingly, the NAND circuits 20, 21 are responsive to inverted and non-inverted PWM signals supplied thereto to output signals obtained by inverting the inverted and non-inverted PWM signals, respectively. Then, the FET gate-driving signal circuit 22 is supplied with the non-inverted PWM signal, while the FET gate-driving signal circuit 23 is supplied with the inverted PWM signal.

In the FET gate-driving signal circuit 22, the PWM signal is subjected to push-pull amplification, and has its low frequency components, i.e. commercial frequency components, cut off by the capacitor C3. Before passing the capacitor C3, the PWM signal has constant amplitude with respect to the reference level but the average voltage (integrated value) of this signal varies with the same period as the sine wave signal from the sine wave generator 14. Therefore, this PWM signal contains a component of the same frequency as that of the sine wave signal (commercial frequency). The PWM signal is converted by the capacitor C3 into a pulse train which varies as a whole in reverse phase to the commercial frequency component and always has a zero average voltage.

This pulse train always having a zero average voltage is applied to the primary coils of the pulse transformers A, C. Therefore, the cores of the pulse transformers A, C are almost not magnetically saturated due to the commercial frequency component, making it possible to use small-sized transformers A, C without the fear of being magnetically saturated at the PWM carrier frequency.

The FET gate-driving signal circuit 23 operates just similarly to the FET gate-driving circuit 22.

An output pulse signal from the secondary coil of the pulse transformer A is compared with the breakdown voltage of each of the Zener diodes D3, D4 forming the two-way voltage limitter. The capacitor C5 is charged or discharged by voltage portions of the pulse signal exceeding the corresponding breakdown voltages, so that a voltage occurs across the capacitor C5, which is an average voltage of the amounts by which the output pulse signal exceeds the breakdown voltages of the Zener diodes D3, D4, the average voltage having the commercial frequency. Therefore, a signal which is obtained by superposition of the terminal voltage of the capacitor C5 having the commercial frequency and the output pulse signal from the secondary coil of the pulse transformer A, i.e. the PWM signal before passing the capacitor C3, is reproduced between the gate and source of the FET Q5. The FET Q5 conducts while each positive pulse of the PWM signal is applied to its gate.

An output pulse signal from the secondary coil of the pulse transformer C is also processed in the same manner as the output pulse signal from the pulse transformer A. Thus, the FET's Q5 and Q7 conduct simultaneously.

Output pulse signals from the secondary coils of the pulse transformers B, D are processed in the same manner as the output pulse signals from the secondary coils of the pulse transformers A, C. However, since the PWM signal supplied to the pulse transformers A, C and the PWM signal supplied to the pulse transformers B, D are reverse in phase to each other, the FET's Q6, Q8 do not conduct when the FET's Q5, Q7 conduct, and the FET's Q5, Q7 do not conduct when the FET's Q6, Q8 conduct.

As described above, the invertor circuit 9 carries out switching control based upon a PWM signal which is formed by modulating by a high frequency triangular wave signal a sine wave signal having a commercial frequency which is corrected in a feedback manner based on the output waveform, and then a carrier frequency component contained in the switched output from the invertor 7 is removed by the output circuit 10, whereby alternating current output having the commercial frequency, which is close in waveform to the sine wave signal, is supplied through the leak-detecting circuit 8 and the output terminals 11, 12 to the load.

For further details of the construction and operation of the circuit arrangement of the invertor circuit 9 and the distortion-detecting circuit 13 through the FET gate-driving signal circuit 22, reference should be made to U.S. Ser. No. 07/790,470 assigned to the present assignee.

Next, the operation of the transient inhibit circuit 7 will be described.

Immediately after the engine is started, the output voltage from the AC generator is so low that the voltage at the input terminal of the constant-voltage regulator 5a forming part of the constant-voltage regulator circuit 5 is low. Therefore, at the start of the engine, the voltage at the input terminal of the constant-voltage regulator 5a does not exceed the breakdown voltage of the Zener diode D1 (voltage corresponding to a predetermined engine rotational speed which is lower than the engine rotational speed to be assumed during normal operation of the engine generator), which prevents the Zener diode D1 from conducting. Accordingly, the inverting input terminal of the inverting comparator 701 remains at a low level, and therefore the inverting comparator 701 outputs a high level signal.

Since the NOR circuit 702 outputs a low level signal when it is supplied with a high level signal via at least one of its input terminals, the output from the NOR circuit 702 is low either when the inverting comparator 701 outputs a high level signal or when the leak-detecting circuit 8 outputs a high level signal which indicates detection of a leak.

The low level signal from the NOR circuit 702 is inverted by the invertor 703 into a high level signal, which causes the transistor Q3 to conduct, thereby allowing the capacitor C2 to be discharged. Accordingly, the transistor Q4 does not conduct, which results in a low level of potential at the junction K between the capacitor C1 and the resistance R1.

As a result, the transistor Q1 of the thyristor control circuit 6 remains off to cause the transistor Q2 to conduct, so that the gates of the thyristors of the bridge rectifier 3 are supplied with a low level signal. This prevents the thyristors from conducting and hence the bridge rectifier 3 does not supply a rectified output. In short, when the engine rotational speed is lower than a predetermined value, or when a leak in the load, etc. is detected, the bridge rectifier 3 is inhibited from supplying the rectified output, whereby an unstable operation of the invertor device at the start of the engine as well as the power supply upon detection of the leak are prevented.

Then, as the output voltage from the AC generator gradually increases after the start of the engine, which causes the voltage at the input terminal of the constant-voltage regulator 5a to rise to a level exceeding the breakdown voltage of the Zener diode D1, that is, when the engine rotational speed exceeds the predetermined value, the Zener diode D1 conducts to cause the voltage supplied to the inverting input terminal of the inverting comparator 701 to go high, and hence the inverting comparator 701 outputs a low level signal.

At this time, if no leak is detected, the output from the NOR circuit 702 goes high, and hence the output from the invertor 703 goes low. Accordingly, the transistor Q3 turns off to cause the capacitor C2 to be charged by way of the resistance RT. As the capacitor C2 is thus charged, the potential at the positive terminal of the capacitor C2 gradually rises in accordance with a time constant determined by the capacity of the capacitor C2 and the resistance value of the resistance RT. Responsive to a rise in the potential at the positive terminal of the capacitor C2, the transistor Q4 conducts, which causes a potential at the emitter of the transistor Q4 to rise. However, if the potential at the emitter of the transistor Q4 becomes higher than a potential at the base of the transistor Q4, the transistor Q4 turns off. As a result, the potential at the junction K between the capacitor C1 and the resistance R1 is constantly held at a value slightly lower than the potential at the positive terminal of the capacitor C2. Therefore, the potential at the junction K gradually rises in accordance with the time constant determined by the capacity of the capacitor C2 and the resistance value of the resistance R7, after the engine rotational speed has exceeded the predetermined value.

Accordingly, the thyristor controlled voltage (between X and Y), which is proportional to the potential at the junction K, gradually rises. Finally, the potential at the junction K substantially reaches the positive output potential of the constant-voltage regulator circuit 5, and the gate voltage at the thyristors reaches a predetermined input value for feedback control carried out for maintaining a potential at the junction between the resistances R1 and R2 at a predetermined level.

Thus, even if the engine is started in a state where the output terminals 11, 12 are connected to a load, it is possible to prevent electric current from rushing into the thyristors of the bridge rectifier 3 when the engine generator is in an unstable state in which the output voltage of the AC generator is not sufficiently high. This in turn prevents application of a drastically-changing voltage to the FET's of the bridge invertor 9 when the engine generator is in an unstable state. The effects of this preventive operation are greater as the load connected to the output terminals 11, 12 at the start of the engine is heavier. Particularly when the load is short-circuited, adverse effects on the thyristors and the FET's are very effectively prevented.

Next, the operation of the leak-detecting circuit 8 will be described.

When there is no leak in a load device connected to the output terminals 11, 12, the bridge balanced circuit formed of the resistances R8, R9, R10, and R11 are in a balanced state, so that there arises almost no potential difference between the junction of the resistances R8 and R9 and the junction of the resistances R10 and R11 9. In contrast, when a leak occurs in the load device, a leak current returns from the load device via the ground to the junction of the resistances R10 and R11, so that there arises a potential difference between the two junctions. This potential difference is DC-amplified, and compared in the operational amplifier 803 with the predetermined positive voltage value (upper limit reference value) and in the operational amplifier 804 with the predetermined negative voltage value (lower limit reference value). When the output value from the operational amplifier 802 is higher than the predetermined positive voltage value supplied to the inverting input terminal of the operational amplifier 803, the amplifier 803 outputs a high level signal. On the other hand, when the output value from the operational amplifier 802 is lower than the predetermined negative voltage value supplied to the non-inverting input terminal of the operational amplifier 804, the amplifier 804 outputs a high level signal. In other words, the voltage of the amplified potential difference exceeds or deviates from a predetermined range defined by the above predetermined positive and negative voltage values, the operational amplifier 803 or 804 outputs a high level signal. Responsive to a high level signal outputted from the operational amplifier 803 or 804, the output from the OR circuit 806 goes high. The high output from the OR circuit 806 charges the capacitor C10 according to a time constant determined by the resistance value of the resistance R20 and the capacity of the capacitor C10. When the potential of the junction of the resistance R20 with the capacitor C10 reaches a predetermined high level, a high level signal is outputted via the buffer 807 to the NAND circuit 702. Accordingly, both the invertor circuit 9 and the bridge rectifier 3 are inhibited from operating, as described hereinbefore. Since the high level signal from the buffer 807 is outputted only after the lapse of a predetermined time period determined by the aforementioned time constant, malfunctioning due to noise, etc. is prevented. The time constant is set to such a value as will enable possible quickest operation of the leak-detecting circuit 8 while enabling to discriminate the leak from noise, e.g. set to a retarding time period of 0.5 msec.

The output from the buffer 807 is supplied to the OR circuit 806. Therefore, once the output from the OR circuit 807 goes high, the output from the buffer 807 continues to output a high level signal, even if the output from the OR circuit 805 is subsequently inverted to a low level. As a result, once a leak is detected, the buffer 807 continues to output a high level signal thereafter to thereby keep the invertor circuit 9 inoperative. The leak-detecting circuit 8 is reset only when the AC generator ceases to be driven to thereby completely stop the operation of the invertor-controlled portable generator.

When the output from the buffer 807 goes high, the transistor Q9 conducts to light the light-emitting diode 808. Therefore, while the operation of the inventor circuit 9 is inhibited, the light-emitting diode 808 is lighted to indicate the detection of the leak.

Whether or not leak-detection and output-inhibition of the AC power unit are normally functioning can be checked only by closing the test switch 801. In this connection, by properly selecting the resistance value of the resistance connected in series with the test switch 801, a desired amount of false leakage can be set.

Although the bridge balanced circuit is formed of resistances alone in the embodiment described above, this is not limitative, but it may be formed by use of other impedance elements, including capacitors.

The leak-detecting circuit 8, which has a construction as described in detail heretofore, can dispense with mechanical breaking contacts, which conventional leak breakers necessarily have, and accordingly can promptly detect a leak with high responsiveness, while it is less susceptible to aging deterioration. Further, the function of cutting off a leak is incorporated in the power unit, which utilizes the circuitry for forming and transferring a drive signal to the invertor circuit, and hence simplifies the construction of the leak-detecting circuit, thereby enabling to provide means for detecting and cutting off a leak, which is light in weight, small in size, and low in cost, compared with conventional externally-mounted leak breakers.

Further, since no current transformer is used according to the invention, the leak-detecting circuit 8 can be easily implemented onto a circuit board, which further promotes reduction in the size, weight, and cost thereof.

What is claimed is:

1. In an AC power supplying unit for supplying AC power to loads and for monitoring an AC output and detecting leakage current, including an alternating current generator, a direct current power source circuit for rectifying an alternating current output from said alternating current generator and outputting a direct current output, driving signal-forming means for forming and outputting a driving signal, an invertor circuit connected to said driving signal-forming means for performing switching control of said direct current output in response to said driving signal, an output circuit connected to said invertor circuit for outputting an alternating current output having a predetermined frequency, and a pair of output lines connected to said output circuit, the improvement comprising:

a bridge balanced circuit connected to said pair of output lines, said bridge balanced circuit having two balanced points and comprising a plurality of impedance elements connected to said pair of output lines, neither of said pair of output lines being grounded;

a grounding terminal grounding one of said balanced points;

detecting means for detecting a potential difference between said grounding terminal and another of said balanced points, and for outputting a detection signal indicative of the detected potential difference; and determining means for determining whether said detection signal falls within a predetermined range, and for supplying a stoppage instruction signal to said driving signal-forming means when said detection signal falls outside of said predetermined range;

wherein said driving signal-forming means stops outputting said driving signal in response to said stoppage instruction signal from said determining means; and wherein said determining means comprises a first comparator having an upper limit reference value corresponding to an upper limit of said predetermined range, and a second comparator having a lower limit reference value corresponding to a lower limit of said predetermined range, said detection signal from said detecting means being compared with said upper limit reference value and said lower limit reference value by said first and second comparators, respectively, for enabling detecting a leakage current in both of positive and negative directions, and said determining means outputting said stoppage instruction signal when said detection signal falls outside of said predetermined range defined by said upper limit reference value and said lower limit reference value, whereby leakage current in both of said positive and negative directions can be detected.

2. An AC power supplying unit according to claim 1, wherein said bridge balanced circuit comprises two pairs of two serially connected resistances connected between said pair of output lines, said one of said two balanced points being a junction of one of said two pairs of two serially connected resistances, and said another of said two balanced points being a junction of the other of said two pairs of two serially connected resistances.

3. An AC power supplying unit according to claim 1, including a transient inhibit circuit for stopping the operation of said direct current power source circuit when said power unit is in a predetermined transient condition, wherein said stoppage instruction signal is supplied to said transient inhibit circuit, and said transient inhibit circuit stops the operation of said direct current power source circuit in response to said stoppage instruction signal.

4. An AC power supplying unit according to claim 3, wherein said stoppage instruction signal is supplied to said driving signal-forming means by way of said transient inhibit circuit.

5. An AC power supplying unit according to claim 2, including a transient inhibit circuit for stopping the operation of said direct current power source circuit when said power unit is in a predetermined transient condition, wherein said stoppage instruction signal is supplied to said transient inhibit circuit stops the operation of said direct current power source circuit in response to said stoppage instruction signal.

6. An AC power supplying unit according to claim 3, wherein said transient inhibit circuit includes a direct current outputting circuit for obtaining a second direct current output from the alternating current output from said alternating current generator, and a third comparator for comparing the second direct current output with a first predetermined value, said stoppage instruction signal being supplied to said driving signal-forming means when said second direct current output exceeds a second predetermined value.

7. An AC power supplying unit according to claim 1, wherein said power unit is a portable type, and said alternating current generator is driven by an engine.

* * * * *